United States Patent
Lee et al.

(10) Patent No.: US 10,910,670 B2
(45) Date of Patent: Feb. 2, 2021

(54) NEGATIVE ELECTROLYTE FOR LITHIUM METAL BATTERY, LITHIUM METAL BATTERY INCLUDING THE SAME, AND METHOD OF MANUFACTURING LITHIUM METAL BATTERY

(71) Applicants: Samsung Electronics Co., Ltd., Suwon-si (KR); Samsung SDI Co., Ltd., Yongin-si (KR)

(72) Inventors: Yonggun Lee, Suwon-si (KR); Saebom Ryu, Suwon-si (KR); Toshinori Sugimoto, Hwaseong-si (KR); Dongmin Im, Seoul (KR); Wonseok Chang, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 263 days.

(21) Appl. No.: 16/120,587

(22) Filed: Sep. 4, 2018

(65) Prior Publication Data
US 2019/0190068 A1      Jun. 20, 2019

(30) Foreign Application Priority Data

Dec. 20, 2017   (KR) .................. 10-2017-0176490

(51) Int. Cl.
*H01M 4/02*        (2006.01)
*H01M 10/0565*     (2010.01)
(Continued)

(52) U.S. Cl.
CPC ..... *H01M 10/0565* (2013.01); *H01M 10/052* (2013.01); *H01M 10/058* (2013.01);
(Continued)

(58) Field of Classification Search
CPC ....................................................... H01M 4/02
See application file for complete search history.

(56) References Cited

U.S. PATENT DOCUMENTS

| | | | |
|---|---|---|---|
| 2007/0111105 A1 | 5/2007 | Zaghib et al. | |
| 2009/0317723 A1 | 12/2009 | Yu et al. | |
| 2014/0050990 A1 | 2/2014 | Yuan et al. | |

FOREIGN PATENT DOCUMENTS

| | | |
|---|---|---|
| EP | 3203565 A1 | 8/2017 |
| JP | 5006646 B2 | 8/2012 |

(Continued)

OTHER PUBLICATIONS

"Cross-linked Composite Gel Polymer Electrolyte using Mesoporous Methacrylate-Functionalized SiO2 Nanoparticles for Lithium-Ion Polymer Batteries" Shin, Won-kyung; Cho, Jinhyun; Kannan, Aravindaraj G; Lee, Yoon-sung; Kim, Dong-won.Scientific Reports (Nature Publisher Group); London vol. 6, (May 2016).*

(Continued)

*Primary Examiner* — Jacob B Marks
(74) *Attorney, Agent, or Firm* — Cantor Colburn LLP

(57) ABSTRACT

A negative electrolyte for a lithium metal battery, the negative electrolyte including: a non-aqueous solvent comprising an ether solvent; a lithium salt having a concentration of about 1 molar to about 6 molar in the non-aqueous solvent; and a crosslinked product of a polymerizable oligomer, wherein the negative electrolyte has a gel or solid form.

25 Claims, 8 Drawing Sheets

(51) Int. Cl.
  *H01M 10/058* (2010.01)
  *H01M 10/052* (2010.01)
(52) U.S. Cl.
  CPC .............. *H01M 2300/0082* (2013.01); *H01M 2300/0085* (2013.01)

(56) References Cited

FOREIGN PATENT DOCUMENTS

| | | |
|---|---|---|
| KR | 1020080022677 A | 3/2008 |
| KR | 1020140145450 A | 12/2014 |
| KR | 101571531 B1 | 11/2015 |
| KR | 101655627 B1 | 9/2016 |
| KR | 101737223 B1 | 5/2017 |
| WO | 2014200198 A1 | 12/2014 |

OTHER PUBLICATIONS

Ji-Ae Choi et al., "Cycling characteristics of lithium powder polymer cells assembled with cross-linked gel polymer electrolyte", Electrochimica Acta, Mar. 31, 2014, vol. 132, pp. 1-6.

Jiangfeng Qian et al., "High rate and stable cycling of lithium metal anode", Nature communications, Feb. 20, 2015, pp. 1-9.

Jianhui Wang et al., "Superconcentrated electrolytes for a high-voltage lithium-ion battery", Nature Communications, Jun. 29, 2016, pp. 1-9.

Xian-Xiang Zeng et al., "Reshaping Lithium Plating/Stripping Behavior via Bifunctional Polymer Electrolyte for Room-Temperature Solid Li Metal Batteries", Journal of the American Chemical Society, Nov. 30, 2016, pp. 1-4.

Yuki Yamada et al., "Review—Superconcentrated Electrolytes for Lithium Batteries", Journal of the Electrochemical Society, vol. 162(14), Oct. 9, 2015, pp. A2406-A2423.

* cited by examiner

INJECTION

GELATION OR
SOLIDIFICATION

NEGATIVE ELECTROLYTE FOR LITHIUM METAL BATTERY, LITHIUM METAL BATTERY INCLUDING THE SAME, AND METHOD OF MANUFACTURING LITHIUM METAL BATTERY

CROSS-REFERENCE TO RELATED APPLICATION

This application claims priority to and the benefit of Korean Patent Application No. 10-2017-0176490, filed on Dec. 20, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to a negative electrolyte for a lithium metal battery, a lithium metal battery including the negative electrolyte, and a method of manufacturing the lithium metal battery.

2. Description of the Related Art

Lithium secondary batteries are high-performance batteries having the highest levels of energy density among other secondary batteries, and are applicable in various fields, for example, as a power source for electric vehicles.

As a negative electrode of a lithium secondary battery, a lithium thin film may be used. When a lithium thin film is used as the negative electrode, the negative electrode may be reactive with a liquid electrolyte during charging or discharging due to the high reactivity of lithium, or dendritic growth may occur on the lithium thin film used as the negative electrode. Accordingly, a lithium secondary battery including such a lithium metal thin film may have reduced lifetime and stability. Therefore, there is a need for improvement in this regard.

SUMMARY

Provided is a negative electrolyte for a lithium metal battery, the negative electrolyte capable of improving the lifetime characteristics and stability of the lithium metal battery.

Provided is a lithium metal battery employing the negative electrolyte.

Provided is a method of manufacturing the lithium metal batteries.

Additional aspects will be set forth in part in the description which follows and, in part, will be apparent from the description, or may be learned by practice of the presented embodiments.

According to an aspect of an embodiment, a negative electrolyte for a lithium metal battery includes: a non-aqueous solvent including an ether solvent; a lithium salt having a concentration of about 1 molar (M) to about 6 M in the non-aqueous solvent; and a crosslinked product of a polymerizable oligomer, wherein the negative electrolyte has a gel or solid form.

According to an aspect of another embodiment, a lithium metal battery includes: a lithium metal electrode including a lithium metal or a lithium metal alloy; the negative electrolyte of the above aspect on at least a portion of the lithium metal electrode; and a positive electrode facing the lithium metal electrode.

According to an aspect of another embodiment, a method of manufacturing a lithium metal battery includes: injecting a negative electrolyte composition for a negative electrolyte between a lithium metal electrode and a positive electrode to prepare an injected negative electrolyte composition, wherein the lithium metal electrode includes a lithium metal or a lithium metal alloy, and the negative electrolyte composition includes a non-aqueous solvent including an ether solvent, a lithium salt having a concentration of about 1 M to about 6 M in the non-aqueous solvent, and a polymerizable oligomer; and heat-treating the injected negative electrolyte composition to form a gelled or solidified negative electrolyte including a crosslinked product of the polymerizable oligomer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
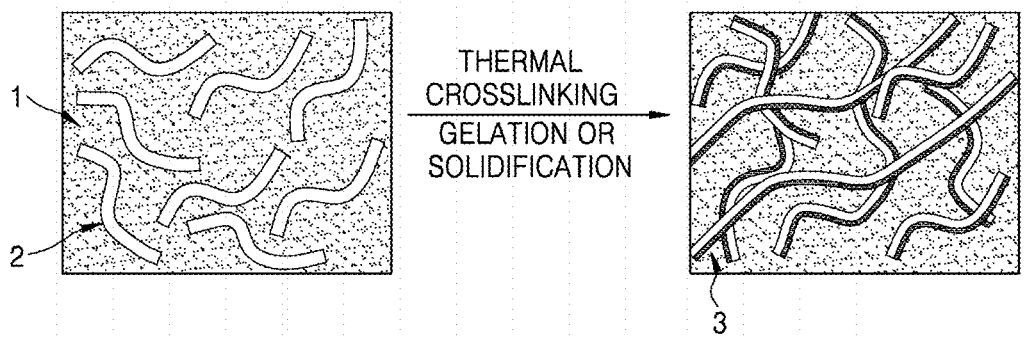
FIG. 1 is schematic view for explaining the concept of a negative electrolyte for a lithium metal battery, according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout The terminology used herein is for the purpose of describing particular embodiments only and is not intended to restrict the present inventive concept. As used herein, the singular forms "a," "an" and "the" are intended to include the plural forms as well, unless the context clearly indicates otherwise. "At least one" is not to be construed as limiting "a" or "an." "Or" means "and/or." It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. As used herein the term "/" may be interpreted as "and" or "or" depending on the situation.

In the drawings, diameters, lengths, and thicknesses are enlarged or reduced in order to clearly illustrate various components, layers, and regions. Like reference numerals refer to like elements throughout the specification. It is to be understood that when a layer, film, region, plate, or the like is referred to as being "on" or "on" another portion throughout the specification, this includes not only the case directly above another portion but also the case where there is another portion in between. In contrast, when an element is referred to as being "directly on" another element, there are no intervening elements present. It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a negative electrolyte for a lithium metal battery, a lithium metal battery including the negative electrolyte, and a method of manufacturing the lithium metal battery will be further described with reference to the accompanying drawings.

According to an embodiment, a negative electrolyte for a lithium metal battery has a gel or solid form and includes: a non-aqueous solvent including an ether solvent; a lithium salt having a concentration of about 1 molar (M) to about 6 M in the non-aqueous solvent; and a crosslinked product of a polymerizable oligomer.

Lithium metal batteries have been manufactured using an ether-based solvent and a lithium salt, which are known to be stable in lithium metal, as an electrolyte. However, the ether-based electrolyte could not inhibit dendrite growth and volume change due to the low strength of the ether-based electrolyte and instability of the lithium salt. In order to solve this problem, attempts have been made to improve the stability of the electrolyte by introducing a high-concentration of a lithium salt, but this has not been a fundamental solution.

The present inventors have advantageously discovered that when a negative electrolyte having a gel or solid form is prepared by injecting, in a liquid state, a negative electrolyte composition including a thermally crosslinkable polymerizable oligomer mixed with an ether-based (ether-containing) electrolyte including a high-concentration of a lithium salt, into an electrochemical element, and then performing in-situ thermal crosslinking, the negative electrolyte has ionic conductivity similar to that of a liquid, has very high strength, has excellent lithium electrodeposition properties, and may remarkably improve the lifetime characteristics and stability of a lithium metal battery.

The polymerizable oligomer, which is an oligomer having a crosslinkable functional group, may have a weight average molecular weight of about 5,000 Daltons or less, or about 2,000 Daltons or less, or about 1,000 Daltons or less, or about 200 Daltons to about 1,000 Daltons, or about 200 Daltons to about 500 Daltons. When the polymerizable oligomer has a weight average molecular weight within these ranges, the polymerizable oligomer may be in an easily injectable form such as liquid form or being soluble in a solvent. The polymerizable oligomer may have a low viscosity of about 3 centipose (cP) to about 50 cP. When the polymerizable oligomer has a viscosity within this range, a negative electrolyte composition including the polymerizable oligomer may easily permeate between the particles of a protective layer and fill the gaps between the particles in the protective layer, so that the protective layer may have high strength. As used herein, the term "polymerizable oligomer" refers to an oligomer which is capable of being polymerized to form a polymer.

The crosslinked product of the polymerizable oligomer may have a weight average molecular weight of about 10,000 Daltons to about 300,000 Daltons.

The crosslinked product of the polymerizable oligomer may have a degree of crosslinking of, for example, about 90% to about 100%.

The polymerizable oligomer may include an ion conductive unit including an ether group. The polymerizable oligomer including the ion conductive unit including the ether group may be used to obtain a crosslinked product of the same ether-based polymerizable oligomer used as the ether-based solvent. The crosslinked product of the polymerizable oligomer including an ion conductive unit including ether group is capable of transferring ions therethrough. When such a negative electrolyte is employed, the ionic conductivity of a negative electrode can be improved.

Further, the polymerizable oligomer may include a thermally crosslinkable acrylate-based (acrylate containing) functional group. The thermally crosslinkable acrylate-based functional group is used to obtain a gelled or solidified negative electrolyte through a one-pot crosslinking process, while being injected in a liquid state in the manufacturing of a lithium metal battery.

For example, the polymerizable oligomer may include diethylene glycol diacrylate (DEGDA), triethylene glycol diacrylate (TEGDA), tetraethylene glycol diacrylate (TTEGDA), polyethylene glycol diacrylate (PEGDA), dipropylene glycol diacrylate (DPGDA), tripropylene glycol diacrylate (TPGDA), ethoxylated trimethylolpropane triacrylate (ETPTA), acrylate-functionalized ethylene oxide, 1,6-hexanediol diacrylate, ethoxylated neopentyl glycol diacrylate (NPEOGDA); propoxylated neopentyl glycol diacrylate (NPPOGDA), allyl methacrylate (ALMA), trimethylolpropane triacrylate (TMPTA), trimethylolpropane trimethacrylate (TMPTMA), pentaerythritol triacrylate (PETA), ethoxylated propoxylated trimethylol propane triacrylate (TMPEOTA)/(TMPPOTA), glyceryl/propoxylated triacrylate (GPTA)/(GPPOTA), tris(2-hydroxyethyl) isocyanurate triacrylate (THEICTA), pentaerythritol tetraacrylate (PETTA), dipentaerythritol pentaacrylate (DPEPA), or a combination thereof.

The polymerizable oligomer and the crosslinked product formed from the polymerizable oligomer may have ionic conductivity. When the polymerizable oligomer and the crosslinked product of the polymerizable oligomer have ionic conductivity, the ionic conductivity of a negative electrolyte may be further improved.

The amount of the crosslinked product of the polymerizable oligomer in the negative electrode may be about 10 parts by weight to about 60 parts by weight, or about 10 parts by weight to about 50 parts by weight, or about 20 parts by weight to about 40 parts by weight, based on 100 parts by weight of the particles. When the amount of the crosslinked product of the polymerizable oligomer is within these ranges, the negative electrolyte may have excellent mechanical properties.

For example, the ether-based solvent may include dimethyl ether, diethyl ether, methyl ethyl ether, dibutyl ether, 1,2-dimethoxyethane, 1,2-diethoxyethane, ethoxymethoxyethane, 2-methyltetrahydrofuran, tetrahydrofuran, ethyleneglycol dimethyl ether (1,2-dimethoxyethane), ethylene glycol diethyl ether (1,2-diethoxyethane), propylene glycol dimethyl ether, propylene glycol diethyl ether, butylene glycol dimethyl ether, butylene glycol diethyl ether, diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, dipropylene glycol dimethyl ether, tripropylene glycol dimethyl ether, tetrapropylene glycol dimethyl ether, dipropylene glycol diethyl ether, tripropylene glycol diethyl ether, tetrabutylene glycol dimethyl ether, tetrabutylene glycol dimethyl ether, dibutylene glycol diethyl ether, tributylene glycol diethyl ether, tetrabutylene glycol diethyl ether, poly(ethylene glycol) dilaurate (PEGDL), poly(ethylene glycol) monoacrylate (PEGMA), poly(ethylene glycol) diacrylate (PEGDA), or a combination thereof.

The ether-based solvent has relatively higher stability with respect to the lithium metal electrode as compared with a carbonate solvent.

The ether-based solvent may be included in an amount of about 50 volume percent (vol %) or greater, or about 60 vol % or greater, or about 70 vol % or greater, or about 80 vol % or greater, or about 90 vol % or greater, or about 100 vol %, based on the total volume of the non-aqueous solvent. The non-aqueous solvent may be composed of 100 vol % of the ether-based solvent. The ether-based solvent within the above ranges can be used to obtain a negative electrolyte having high stability against a lithium metal electrode.

The non-aqueous solvent may further include other types of organic solvents to such an extent that the stability of the ether-based solvent to the lithium metal electrode is not impaired. These organic solvents may be any suitable organic solvent. Examples of the organic solvents include propylene carbonate, ethylene carbonate, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, fluoroethylene carbonate, benzonitrile, acetonitrile, tetrahydrofuran, 2-methyltetrahydrofuran, γ-butyrolactone, 1,3-dioxolane, 4-methyldioxolane, N, N-dimethylacetamide, dimethyl sulfoxide, dioxane, 1,2-dimethoxyethane, sulfolane, dichloroethane, chlorobenzene, nitrobenzene, diethylene glycol, dimethyl ether, or a combination thereof.

The lithium salt may include, for example, LiSCN, LiN(CN)$_2$, LiClO$_4$, LiBF$_4$, LiAsF$_6$, LiPFe, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbFe, LiPF$_3$(CF$_2$CF$_3$)$_3$, LiPF$_3$(CF$_3$)$_3$, LiB(C$_2$O$_4$)$_2$, or a combination thereof.

The lithium salt may be included in the non-aqueous solvent including the ether-based solvent at a relatively high concentration. For example, the lithium salt may have a concentration of about 1 M to about 6 M, or about 2 M to about 6 M, or about 3 M to about 5 M, or about 4 M to about 5 M. The lithium salt within the above-described ranges can further improve the stability of the ether-based solvent to the lithium metal electrode.

Figure 2:
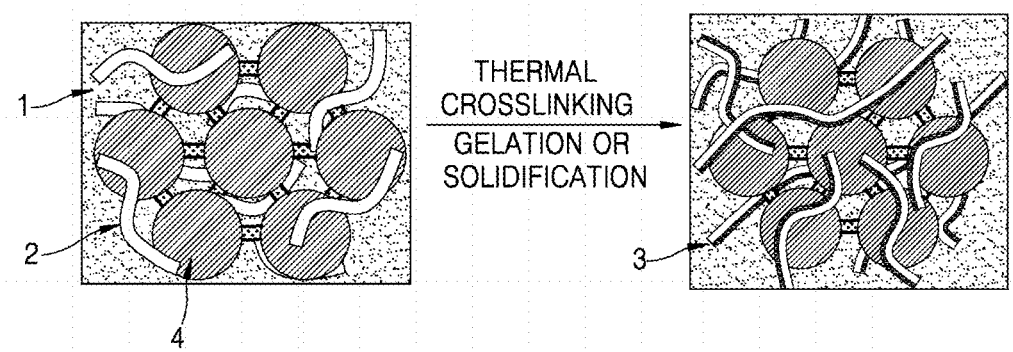
FIG. 2 is schematic view for explaining the concept of a negative electrolyte for a lithium metal battery, according to another embodiment.

As shown in FIG. 1, when the negative electrolyte composition including the ether-based solvent 1 and the polymerizable oligomer 2 is subjected to crosslinking (e.g., thermal crosslinking), the formation of the crosslinked product of the polymerizable oligomer 3 results in the gelation or solidification of the negative electrolyte composition. As shown in FIG. 2, in order to further improve mechanical properties, the negative electrolyte may further include at least one particle 4. The particle 4 may include an organic particle an inorganic particle, an organic-inorganic particle, or a combination thereof. The particle 4 may have a particle size of greater than 1 micrometer (μm) to about 100 μm. The negative electrode formed integrally with the particle 4 may have high strength.

The negative electrolyte including the particle has a Young's modulus of about $10^6$ Pascals (Pa) or greater, or about $10^8$ Pa to about $10^{10}$ Pa. The mechanical properties of the negative electrolyte can be further improved by increasing the Young's modulus of the negative electrode.

A Young's modulus may have the same meaning as a "tensile modulus." The tensile modulus is measured using a dynamic mechanical analysis system (DMA800, available from TA Instruments), and the negative electrolyte specimens are prepared in accordance with the ASTM standard D412 (Type V specimens). Variations in strain with respect to stress in a negative electrolyte sample were measured at about 25° C., a relative humidity of about 30%, and a rate of 5 millimeters (mm) per minute, to obtain a stress-strain curve. The tensile modulus of the negative electrolyte was calculated from the slope of the stress-strain curve.

The at least one particle 4 in the negative electrolyte, as shown in FIG. 2, may have a chemically or physically crosslinked structure. The at least one particle having a chemically or physically crosslinked structure may include, for example, an organic particle including a crosslinked polymer obtained from a polymer having a crosslinkable functional group, an inorganic particle having a crosslinked structure due to a crosslinkable functional group on a surface thereof, or the like. A combination comprising at least one of the foregoing may also be used. The crosslinkable functional group, which is involved in the crosslinking reaction, may be, for example, an acryl group, a methacryl group, a vinyl group, or the like.

The crosslinking may proceed by applying heat or by radiating light such as UV light. Here, heat or light may be applied to an extent that it does not adversely affect the lithium metal electrode.

As used herein, a particle having a chemically crosslinked structure refers to a particle in which crosslinking has occurred using chemical methods (e.g., chemical agents) to facilitate the formation of chemical bonds between crosslinkable functional groups present in the material. A particle having a physically crosslinked structure refers to a particle in which crosslinking has occurred using physical methods, for example, heating a polymer forming the particle until it reaches its glass transition temperature (Tg), in order to facilitate the formation of bonds between crosslinkable functional groups, i.e., crosslinks which are not formed using chemical agents. The crosslinking may occur within the particle itself, between adjacent particles, or may be a combination thereof. The bonds are covalent bonds or ionic bonds.

The particle may have a shape which includes a spherical shape, a microsphere shape, a rod shape, an ellipsoidal shape, a radial shape, or a combination thereof. When the particle has a spherical shape, the particle may be a microsphere having an average particle diameter of greater than 1 μm to about 100 μm or less. The microspheres may have an average particle diameter of about 1.1 μm to about 50 μm, about 1.5 μm to about 75 μm, or about 1.5 μm to about 50 μm, for example, about 1.5 μm to about 10 μm.

The type of particle used is not limited as long as it can be used to form the negative electrolyte of the lithium metal electrode.

According to an embodiment, the particle may include a polymer having low wettability against a liquid electrolyte.

The particle may include a polystyrene homopolymer, a copolymer including a styrene repeating unit, a polymer or copolymer including a repeating unit having a crosslinkable functional group, a crosslinked polymer thereof, or a combination thereof.

The particle may include a polymer (homopolymer or copolymer) including a styrene repeating unit. As such, in the case of a polymer having a styrene repeating unit, the polymer is hydrophobic, and is essentially not wetted by the electrolyte, the polymer does not adversely affect the lithium metal electrode, and the reactivity between the lithium metal electrode and the electrolyte is minimized.

The particle may include a polystyrene homopolymer, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(acrylonitrile-styrene-(C1-C9 alkyl)acrylate) copolymer; a crosslinked polymer thereof, or a combination thereof.

The crosslinked polymer may be a poly (styrene-divinylbenzene) copolymer, a poly (methyl methacrylate-divinylbenzene), or a crosslinked product formed by crosslinking the polymer including a repeating unit having a crosslinkable functional group. A combination comprising at least one of the foregoing polymers may also be used.

When the copolymer includes a styrene repeating unit, the amount of the styrene repeating unit is about 65 parts by weight to about 99 parts by weight, or about 80 parts by weight to about 99 parts by weight, or about 90 parts by weight to about 99 parts by weight, or about 96 parts by weight to about 99 parts by weight, based on 100 parts by weight of the total amount of the copolymer.

When the copolymer includes divinylbenzene, the amount of the divinylbenzene is about 1 part by weight to about 35 parts by weight, or about 1 part by weight to about 20 parts by weight, or about 1 part by weight to about 10 parts by weight, or about 1 part by weight to about 4 parts by weight, or about 3 parts by weight to about 7 parts by weight, or about 3 parts by weight to about 5 parts by weight, based on 100 parts by weight of the copolymer.

The above-mentioned copolymers include a block copolymer, a random copolymer, an alternating copolymer, and a graft copolymers. A combination comprising at least one of the foregoing may also be used. The weight average molecular weight of such copolymers is about 10,000 Daltons to about 200,000 Daltons.

The blocks constituting the block copolymer sequentially include a block including a first repeating unit (first block), a block including a second repeating unit (second block), and a block including a third repeating unit (third block).

The block including a first repeating unit may have a weight average molecular weight of about 10,000 Daltons or more, or about 10,000 Daltons to about 500,000 Daltons, or about 15,000 Daltons to about 400,000 Daltons. According to another embodiment, the block including the first repeating unit may have a weight average molecular weight of about 20,000 Daltons to about 200,000 Daltons. The amount of the block including a first repeating unit is about 20 parts by weight to about 50 parts by weight, or about 20 parts by weight to about 40 parts by weight, or about 22 parts by weight to about 30 parts by weight, based on 100 parts by weight of the total amount of the copolymer. When such a polymer block is used, a negative electrolyte having excellent mechanical properties such as strength can be obtained.

The block including a second repeating unit may have a weight average molecular weight of about 10,000 Daltons or more, or about 10,000 Daltons to about 510,000 Daltons, or about 15,000 Daltons to about 400,000 Daltons. According to another embodiment, the block including a second repeating unit may have a weight average molecular weight of about 20,000 Daltons to about 200,000 Daltons. When such a polymer block is used, a negative electrolyte excellent in mechanical properties such as strength can be obtained. When the hard block having the above-described weight average molecular weight is used, a negative electrolyte having excellent ductility, elasticity and strength can be obtained.

As used herein, the weight average molecular weight can be measured using methods known to those skilled in the art. For example, the weight average molecular weight is measured using gel permeation chromatography (GPC).

The block copolymer includes a diblock copolymer (A-B), a triblock copolymer (A-B-A' or B-A-B'), or a combination thereof.

In the triblock copolymer including the above-mentioned first block, second block, and third block, the total amount of the first block and the third block is about 20 parts by weight to about 35 parts by weight or about 22 parts by weight to about 30 parts by weight, based on 100 parts by weight of the total amount of the block copolymer, and the amount of the second block is about 65 parts by weight to about 80 parts by weight or about 70 parts by weight to about 78 parts by weight, based on 100 parts by weight of the block copolymer.

The particle may include polyvinylpyridine, polyvinylcyclohexane, polyglycidyl acrylate, poly(2,6-dimethyl-1,4-phenylene oxide), a polyolefin, poly(tertbutyl vinyl ether), polycyclohexyl vinyl ether, polyvinyl fluoride, a poly(styrene-maleic anhydride) copolymer, polyglycidyl methacrylate, polyacrylonitrile, a polymeric ionic liquid (PIL), or a combination thereof.

The particle may include a poly(styrene-divinylbenzene) copolymer, a poly(methyl methacrylate-divinylbenzene) copolymer, a poly(ethyl methacrylate-divinylbenzene) poly(methyl methacrylate-divinylbenzene) copolymer, a poly(methyl methacrylate-divinylbenzene) copolymer, a poly(butyl methacrylate-divinylbenzene) copolymer, a poly(propyl acrylate-divinyl benzene) copolymer, a poly(propyl acrylate-divinyl benzene) copolymer, a poly(butyl acrylate-divinyl benzene) copolymer, a poly(acrylonitrile-butadiene-styrene) copolymer, or a combination thereof.

The particle in the negative electrolyte may be an organic particle. The organic particle may include a polystyrene homopolymer or a poly(styrene-divinyl benzene) copolymer.

The particle of the negative electrolyte may be an inorganic particle. The inorganic particle may include $SiO_2$, $TiO_2$, $ZnO$, $Al_2O_3$, $BaTiO_3$, or a combination thereof.

The particle of the negative electrolyte may be an organic-inorganic particle. The organic-inorganic particle may include a cage-structured silsesquioxane, a metal-organic frame (MOF), or a combination thereof.

The cage-structured silsesquioxane may be polyhedral oligomeric silsesquioxane (POSS). The POSS includes eight silicon atoms or less, for example, eight silicon atoms or six silicon atoms. The cage-structured silsesquioxane may be a compound represented by Formula 1.

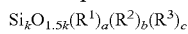

$$Si_kO_{1.5k}(R^1)_a(R^2)_b(R^3)_c \quad \text{Formula 1}$$

In Formula 1, $R^1$, $R^2$, and $R^3$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbon ring group, or a silicon-containing functional group.

In Formula 1, $0<a<20$, $0<b<20$, $0<c<20$, $k=a+b+c$, and the range of a, b, and c is selected to satisfy $6 \leq k \leq 20$.

The cage-structured silsesquioxane may be a compound represented by Formula 2 or a compound represented by Formula 3.

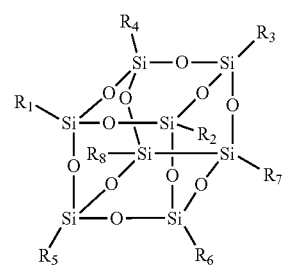

Formula 2

In Formula 2, $R_1$ to $R_8$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbon ring group, or a silicon-containing functional group.

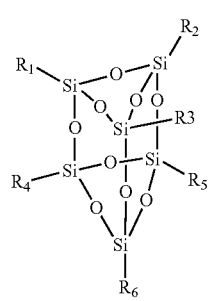

Formula 3

In Formula 3, $R_1$ to $R_6$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbon ring group, or a silicon-containing functional group.

According to an embodiment, the cage-structured silsesquioxane is a compound in which $R_1$ to $R_7$ are each a heptaisobutyl group. For example, the cage-structured silsesquioxane may be heptaisobutyl-t8-silsesquioxane.

The metal-organic framework (MOF) may be a porous crystalline compound in which a Group 2 to Group 15 metal ion or a Group 2 to Group 15 metal ionic cluster is chemically bonded with an organic ligand.

The organic ligand refers to an organic group that may form an organic bond such as a coordinate bond, an ionic bond, or a covalent bond. For example, an organic group having at least two binding sites for metal ions such as those described above may form a stable structure through binding with the metal ions.

The Group 2 to Group 5 metal ion may include cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), bismuth (Bi), or a combination thereof. The organic ligand may be a group derived from a compound including an aromatic dicarboxylic acid, an aromatic tricarboxylic acid, an imidazole-based compound, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, and a compound having a functional group including an amino group, an imino group, an amide group, a dithio carboxylic acid group (—$CS_2H$), a dithio carboxylate group (—$CS_2^-$), a pyridine group, a pyrazine group, or a combination thereof.

Examples of the aromatic dicarboxylic acid and aromatic tricarboxylic acid may include benzene dicarboxylic acid, benzene tricarboxylic acid, biphenyl dicarboxylic acid, and terphenyl-dicarboxylic acid.

The organic ligand may be a group derived from at least one of the compounds represented by Formula 4.

Formula 4

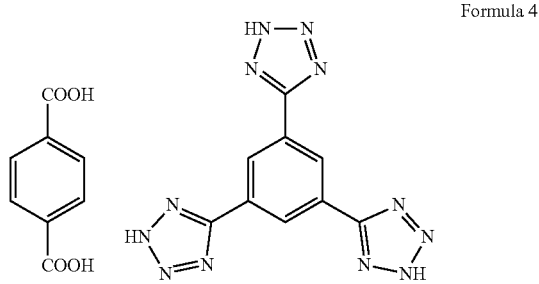

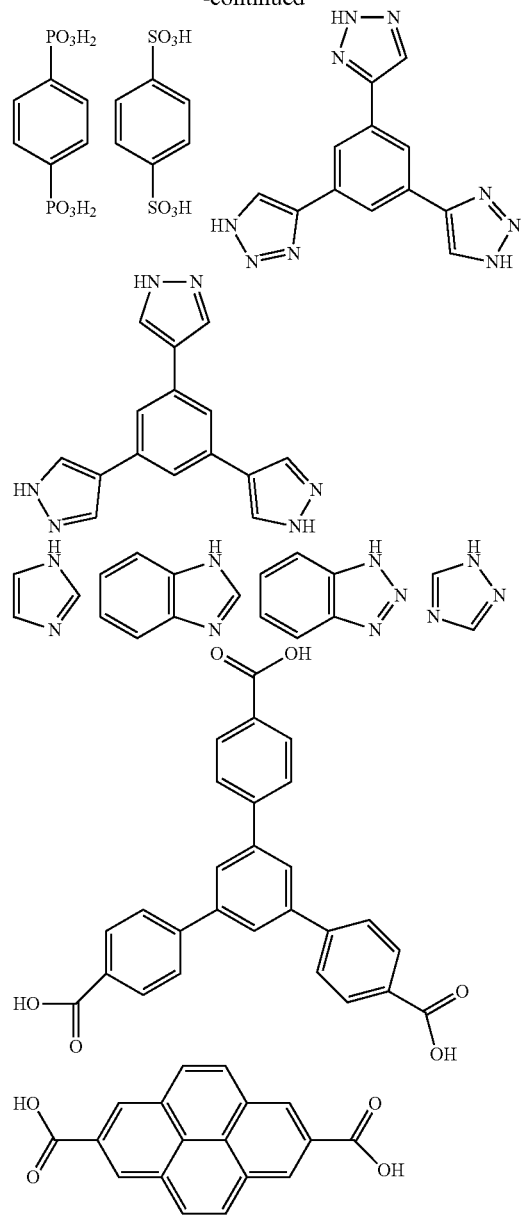

The metal-organic framework (MOF) may be, for example, $Ti_8O_8(OH)_4[O_2C—C_6H_4—CO_2]_6$, Cu (bpy) $(H_2O)_2(BF_4)_2$(bpy) {bpy=4,4'-bipyridine}, $Zn_4O(O_2C—C_6H_4—CO_2)_3$ (Zn-terephthalic acid-MOF, Zn-MOF), or Al(OH){$O_2C—C_6H_4—CO_2$}. A combination comprising at least one of the foregoing may also be used.

The inorganic particle and the inorganic portion of the organic-inorganic particle, may include silica, titania, alumina, $BaTiO_3$, a cage-structured silsesquioxane, a metal-organic framework (MOF), $Li_{1+x+y}Al_xTi_{2-x}Si_yP_{3-y}O_{12}$ (wherein $0<x<2$ and $0\leq y<3$), $BaTiO_3$, $Pb(Zr_aTi_{1-a})O_3$ (PZT) wherein $0\leq a\leq 1$, $Pb_{1-x}La_xZr_{1-y}Ti_yO_3$ (PLZT, wherein $0\leq x\leq 1$ and $0\leq y<1$), $PB(Mg_3Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and 0<z<3), $Li_{1+x+y}(Al_aGa_{1-a})_x(Ti_bGe_{1-b})_{2-x}Si_yP_{3-y}O_{12}$ (wherein 0≤y≤1 and 0≤a≤1, and 0≤b≤1), lithium lanthanum titanate ($Li_xLa_yTiO_3$, wherein 0<x<2 and 0<y<3), lithium germanium thiophosphate ($Li_xGe_yP_zS_w$, wherein 0<x<4, 0<y<1, 0<z<1, and 0<w<5), lithium nitride ($Li_xN_y$, wherein 0<x<4 and 0<y<2), a $SiS_2$ glass ($Li_xSi_yS_z$, wherein 0<x<3, 0<y<2, and 0<z<4), a $P_2S_5$ glass ($Li_xP_yS_z$, wherein 0<x<3, 0<y<3, and 0<z<7), $Li_2O$, LiF, LiOH, $Li_2CO_3$, $LiAlO_2$, a ceramic of the formula $Li_2O$—$Al_2O_3$—$SiO_2$—$P_2O_5$—$TiO_2$—$GeO_2$, and a garnet of the formula $Li_{3+x}La_3M_2O_{12}$, wherein (0≤x≤5), and M is Te, Nb, or Zr; or a crosslinked structure thereof; or a combination thereof.

The crosslinkable functional group may be any crosslinkable functional group, for example, an acrylate group, a methacrylate group, an epoxy group, or the like.

When the particle has a crosslinkable functional group on the surface thereof, the particles may be covalently bonded to each other, so that the mechanical strength of the negative electrolyte including these particles can be further improved.

When the particles include the above-mentioned crosslinked polymer, the particles are connected to each other through crosslinking (covalent bonds), so that the mechanical strength of the negative electrode electrolyte is excellent. The crosslinked polymer contained in the negative electrolyte has a degree of crosslinking of about 10% to about 30%, for example, about 12% to about 28%, for example, about 15% to about 25%, based on the total volume of the crosslinked polymer.

According to an embodiment, the negative electrolyte may include a particle (also referred to as a "first particle") selected from an organic particle, an inorganic particle, and an organic-inorganic particle, having a particle size of more than 1 μm to about 100 μm, and a second particle having a smaller size than the first particle. The negative electrolyte may further include a plurality of particles having different sizes from the first and second particles.

The second particle has a smaller particle size than the first particle. The second particle may have a particle size of about 1 μm to about 100 μm. In the negative electrolyte, for example, the first particle may have a size of about 3 μm, and the second particle may have a size of about 1 μm. A weight ratio of the first particle to the second particle is not particularly limited, and may be for example, about 1:99 to about 99:1 or about 10:1 to about 2:1.

In the negative electrolyte according to an embodiment, the at least one particle in the negative electrolyte may have a particle size of about 1.1 μm to about 50 μm, about 1.1 μm to about 25 μm, about 1.5 μm to about 20 μm, or about 1.5 μm to about 10 μm.

For example, the particle may include an about 1:1 weight ratio of a poly(styrene-divinylbenzene) copolymer microsphere having an average particle diameter of about 3 μm to a poly(styrene-divinylbenzene) copolymer microsphere having an average particle diameter of about 8 μm; or may include an about 1:1 weight ratio of a poly(styrene-divinylbenzene) copolymer microsphere having an average particle diameter of about 3 μm to a poly(styrene-divinylbenzene) copolymer microsphere having an average particle diameter of about 1.1 μm to about 1.3 μm; or may include an about 1:1 weight ratio of a poly(styrene-divinylbenzene) copolymer microsphere having an average particle diameter of about 3 μm to a poly(styrene-divinylbenzene) copolymer microsphere having an average particle diameter of about 1.3 μm; or may include an about 1:1 weight ratio of a poly(styrene-divinylbenzene) copolymer microsphere having an average particle diameter of about 3 μm to a poly(styrene-divinylbenzene) copolymer microsphere having an average particle diameter of about 1.1 μm.

According to an embodiment, the particle may be a microsphere having a monomodal particle size distribution. The monomodal particle size distribution is defined as having a standard deviation of less than 40%, for example, about 20% or less, or for example, about 10% or less, and may be about 1% to less than 40%, or about 3% to about 10%, as analyzed by a particle size analyzer (Dynamic Light Scattering: DLS, Nicomp 380).

When the particle includes a first particle and a second particle having different particle sizes from each other, the particle may include a large-diameter particle having a size of about 8 μm and a small-diameter particle having a size of about 3 μm. For example, the particle may include a large-diameter particle having a size of about 3 μm and a small-diameter particle having a size of about 1.1 μm to about 1.3 μm. The weight ratio of the large-diameter particles to the small-diameter particles may be, for example, about 8:2 to about 9:1.

The crosslinked material of the polymerizable oligomer included in the negative electrolyte may be present between the particles. The crosslinked material of the polymerizable oligomer may fill the empty spaces between the particles to allow the negative electrolyte to have a structure integrated with the particles, thereby having excellent mechanical properties. Therefore, when employing such a negative electrolyte, the growth of lithium dendrites can be effectively suppressed, the deposition density of lithium can be improved during charging or discharging, and the conductivity characteristics of the negative electrolyte can be improved.

According to another embodiment, a lithium metal battery includes: a lithium metal electrode including a lithium metal or a lithium metal alloy; the negative electrode described above on at least a portion of the lithium metal electrode; and a positive electrode facing the lithium metal electrode.

Examples of the lithium metal battery may include a lithium air battery, a lithium ion battery, a lithium polymer battery, and a lithium sulfur battery.

The lithium metal or lithium metal alloy, used as the lithium metal electrode, may have a thickness of about 100 μm or less, or about 80 μm or less, or about 50 μm or less, or about 30 μm or less, or about 20 μm or less. According to another embodiment, the lithium metal electrode may have a thickness of about 0.1 μm to about 60 μm. Specifically, the lithium metal or the lithium metal alloy may have a thickness of about 1 μm to about 25 μm, for example, about 5 μm to about 20 μm.

The lithium metal alloy may include a lithium metal and a metal/metalloid alloyable with the lithium metal or an oxide of the metal/metalloid. Examples of the metal/metalloid alloyable with lithium metal or an oxide of thereof include Si, Sn, Al, Ge, Pb, Bi, Sb, a Si—Y' alloy (wherein Y' is an alkaline metal, an alkaline earth metal, a Group 13 to 16 element, a transition metal, a rare earth element, or a combination thereof, except for Si), a Sn—Y alloy (wherein Y' is an alkaline metal, an alkaline earth metal, a Group 13 to 16 element, a transition metal, a rare earth element, or a combination thereof, except for Sn), $MnO_x$ (wherein 0<x≤2), or a combination thereof.

Y may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (TI), germanium (Ge), phosphorus (P), arsenic (As), antimony (Sb), bismuth (Bi), sulfur (S), selenium (Se), tellurium (Te), polonium (Po), or a combination thereof. For example, the oxide of a metal/metalloid alloyable with lithium metal may be a lithium titanium oxide, a vanadium oxide, a lithium vanadium oxide, $SnO_2$, $SiO_x$ (wherein $0<x<2$), or the like.

FIGS. 3A to 3D are schematic views illustrating the structures of lithium metal batteries according to embodiments.

Figure 3A:
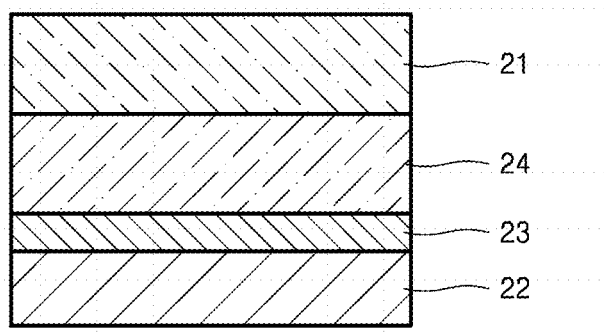
FIGS. 3A to 3D are schematic views illustrating the structures of lithium metal batteries according to various embodiments.

As shown in FIG. 3A, a lithium metal battery has a structure including a positive electrode 21, a lithium metal electrode 22 as a negative electrode, and an electrolyte 24 between the positive electrode 21 and the lithium metal electrode 22. The electrolyte 24 may be the negative electrolyte according to an embodiment described herein.

According to an embodiment, the lithium metal battery may further include a positive electrolyte between the negative electrolyte and the positive electrode. For example, the positive electrolyte may include a liquid electrolyte, a solid electrolyte, a gel electrolyte, a polymeric ionic liquid, or a combination thereof.

The lithium metal battery may further include a separator.

The lithium metal battery may further include a protective layer 23 between the electrolyte 24 and the negative electrode 22. The protective layer 23 may be disposed on at least a portion of the negative electrode 22, so that the surface of the negative electrode 22 may become mechanically and electrochemically stable. As a result, during charging and discharging the lithium metal battery, dendritic formation on the surface of the negative electrode may be suppressed, and interfacial stability between the negative electrode and the electrolyte 24 may be improved. Thus, the lithium metal battery may have improved cycle characteristics.

Figure 3B:
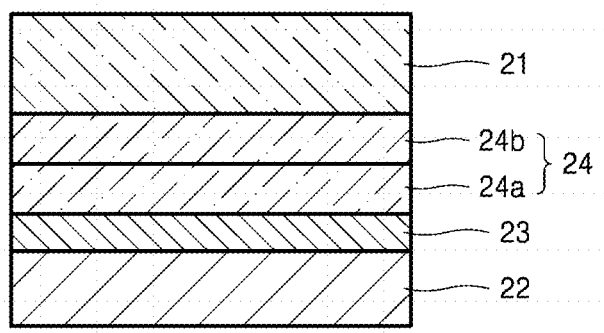

The electrolyte 24, as illustrated in FIG. 3B, may have a two-layer stack structure in which a liquid electrolyte 24a and a solid electrolyte 24b are sequentially stacked. Here, the liquid electrolyte 24a may be adjacent to the protective layer 23. The lithium metal battery may have a stack structure of negative electrode/protective layer/electrolyte (liquid electrolyte/solid electrolyte)/positive electrode, stacked in this order.

Figure 3C:
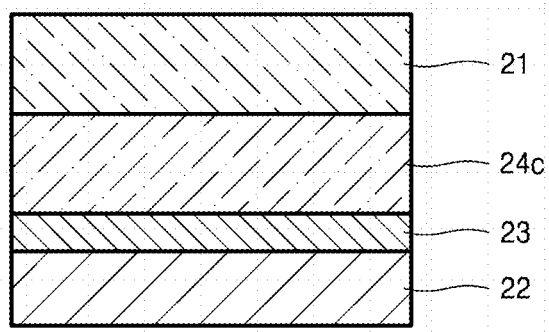

Referring to FIG. 3C, a lithium metal battery according to another embodiment may further include a separator 24c. For example, the separator may be a monolayer film including polyethylene, polypropylene, polyvinylidene fluoride, or a combination thereof, or a multilayer film including at least two layers of polyethylene, polypropylene, polyvinylidene fluoride, or a combination thereof. For example, the separator may be a mixed multilayer film, such as a two-layer separator of polyethylene/polypropylene, a three-layer separator of polyethylene/polypropylene/polyethylene, or a three-layer separator of polypropylene/polyethylene/polypropylene. The separator may include an electrolyte including a lithium salt and an organic solvent.

Figure 3D:
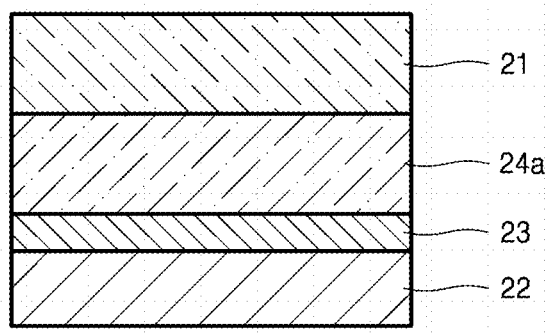

Referring to FIG. 3D, a lithium metal battery according to another embodiment may include a liquid electrolyte 24a. The liquid electrolyte 24a may have a composition which is the same as or different from the composition of a liquid electrolyte that may be included in the protective layer 23.

Figure 4:
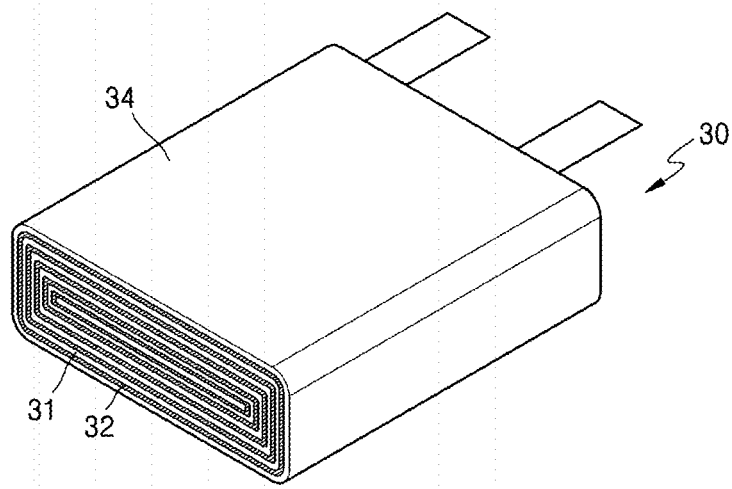
FIG. 4 is a schematic view of a lithium metal battery according to another embodiment.

FIG. 4 is a schematic view of a lithium metal battery according to another embodiment.

The lithium metal battery 30 may include a positive electrode 31, a negative electrode 32 according to an embodiment, and a battery case 34 accommodating the positive electrolyte 31 and the negative electrode 32.

In the embodiments of FIGS. 3A to 3D, the positive electrode 21 may be a porous positive electrode. The porous positive electrode may be a positive electrode including pores, or any positive electrode that allows permeation of a liquid electrolyte thereinto by capillary action.

For example, the porous positive electrode may be a positive electrode that may be obtained by coating and drying a cathode active material composition including a positive active material, a conducting agent, a binder, and a solvent. The resulting positive electrode may include pores between the particles of the positive active material. The porous positive electrode may be impregnated with liquid electrolyte.

According to another embodiment, the positive electrode may include a liquid electrolyte, a gel electrolyte, or a solid electrolyte. The liquid electrolyte, the gel electrolyte, and the solid electrolyte may be any electrolyte suitable for lithium metal batteries, which do not react with the positive active material, and which prevent deterioration of the positive active material during charging and discharging.

Each element of a lithium metal battery including a negative electrolyte according to an embodiment, and a method of manufacturing the lithium metal battery now will be described in detail.

A positive active material for manufacturing the positive electrode may include lithium cobalt oxide, lithium nickel cobalt manganese oxide, lithium nickel cobalt aluminum oxide, lithium iron phosphate, lithium manganese oxide, or a combination thereof, but is not limited thereto. Any positive active material available in the art may be used.

For example, the positive active material may include a compound represented by the following formulae: $Li_aA_{1-b}B'_bD_2$ (wherein $0.90 \leq a \leq 1.8$, and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$. A combination comprising at least one of the foregoing may also be used.

In the formulae above, A is nickel (Ni), cobalt (Co), manganese (Mn), or a combination thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; F' is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

For example, the positive active material may be one of the compounds represented by Formulae 5 to 8.

$$Li_aNi_bCo_cMn_dO_2 \qquad \text{Formula 5}$$

In Formula 5, $0.90 \leq a \leq 1.8$, $0 \leq b \leq 0.9$, $0 \leq c \leq 0.5$, and $0 \leq d \leq 0.5$.

$$Li_2MnO_3 \qquad \text{Formula 6}$$

$$LiMO_2 \qquad \text{Formula 7}$$

In Formula 7, M may be Mn, Fe, Co, or Ni.

$$Li_aNi_bCO_cAl_dO_2 \qquad \text{Formula 8}$$

In Formula 8, $0.90 \leq a \leq 1.8$, $0 \leq b \leq 0.9$, $0 \leq c \leq 0.5$, and $0 \leq d \leq 0.5$.

The positive electrode is manufactured as follows.

A positive active material, a binder, and a solvent are mixed to prepare a positive active material composition.

A conducting agent may be further added into the positive active material composition.

The positive active material composition is directly applied on a metallic current collector and dried to prepare a positive electrode plate. Alternatively, the positive active material composition may be cast on a separate support to form a positive active material film, which may then be separated from the support and then laminated on a metallic current collector to prepare a positive electrode plate.

The binder is a composition that facilitates binding between an active material and a conductive material and binding with a current collector. Non-limiting examples of the binder include polyvinylidene fluoride (PVDF), polyvinyl alcohol, carboxymethylcellulose (CMC), starch, hydroxypropylcellulose, reproduced cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, various copolymers thereof, or a combination thereof. The amount of the binder may be about 1 part by weight to about 50 parts by weight or about 2 parts by weight to about 5 parts by weight, based on 100 parts by weight of the total weight of the positive active material. When the amount of the binder is within the above-described ranges, a binding force of the positive active material layer to the current collector may be satisfactory.

The conducting agent may be any material that does not cause a chemical change in the lithium metal battery and which has electrical conductivity. Non-limiting examples of the conducting agent include graphite such as natural graphite or artificial graphite; carbonaceous materials, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whisky, such as zinc oxide or potassium titanate; a conductive metal oxide, such as a titanium oxide; and a conductive polymer material, such as a polyphenylene derivative. A combination comprising at least one of the foregoing may also be used.

The amount of the conducting agent may be about 1 part by weight to about 10 parts by weight, for example, about 2 parts by weight to about 5 parts by weight, based on 100 parts by weight of the total weight of the positive active material. When the amount of the conducting agent is within the above-described ranges, the finally obtained positive electrode may have good conductivity characteristics.

A non-limiting example of the solvent is N-methylpyrrolidone.

The amount of the solvent may be from about 100 parts by weight to about 2,000 parts by weight, based on 100 parts by weight of the positive active material. When the amount of the solvent is within this range, a process for forming the positive active material layer may be easily carried out.

The amounts of the positive active material, the conducting agent, the binder, and the solvent may be determined by the person of skill in the art without undue experimentation. At least one of the conducting agent, the binder, and the solvent may be omitted depending on the use and structure of a lithium metal battery.

The negative electrode may be, for example, a lithium metal thin film or a lithium metal alloy thin film, as described above.

The lithium metal or lithium metal alloy, used as the lithium metal electrode, may have a thickness of about 100 μm or less, about 80 μm or less, about 50 μm or less, about 30 μm or less, or about 20 μm or less. According to another embodiment, the lithium metal electrode may have a thickness of about 0.1 μm to about 60 μm. Specifically, the lithium metal or the lithium metal alloy may have a thickness of about 1 μm to about 25 μm, for example, about 5 μm to about 20 μm.

The lithium metal alloy may include lithium, a metal/metalloid alloyable with lithium, an oxide thereof, or a combination thereof. Examples of the metal/metalloid alloyable with lithium include Si, Sn, Al, Ge, Pb, Bi, Sb, a Si—Y alloy (wherein Y is an alkaline metal, an alkaline earth metal, a Group 13 to Group 16 element, a transition metal, a rare earth element, or a combination thereof, except for Si), a Sn—Y alloy (wherein Y is an alkaline metal, an alkaline earth metal, a Group 13 to Group 16 element, a transition metal, a rare earth element, or a combination therefor, except for Sn). A combination comprising at least one of the foregoing may also be used.

Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof. For example, the oxide of the metal/metalloid alloyable with lithium may be lithium titanium oxide, vanadium oxide, lithium vanadium oxide, $SnO_2$, $SiO_x$ ($0<x<2$), or the like.

The electrolyte may include a separator and/or a lithium salt-containing nonaqueous electrolyte which are suitable for use in lithium metal batteries in the art.

The separator may be an insulating thin film having high ion permeability and high mechanical strength. The separator may have a pore diameter of about 0.01 μm to about 10 μm, and a thickness of about 5 μm to about 20 μm. Non-limiting examples of the separator are an olefin-based polymer, such as polypropylene, and a sheet or non-woven fabric made of glass fiber or polyethylene. When a solid polymer electrolyte is used as the electrolyte, the solid polymer electrolyte may also serve as the separator.

For example, the separator may be a monolayer film or a multilayer film including at least two layers of polyethylene, polypropylene, polyvinylidene fluoride, or a combination thereof. For example, the separator may be a mixed multilayer film, such as a two-layer separator of polyethylene/polypropylene, a three-layer separator of polyethylene/polypropylene/polyethylene, or a three-layer separator of polypropylene/polyethylene/polypropylene.

The lithium salt-containing nonaqueous electrolyte may include a nonaqueous electrolyte and a lithium salt.

As the nonaqueous electrolyte, a nonaqueous liquid electrolyte, an organic solid electrolyte, or an inorganic solid electrolyte may be used.

The nonaqueous liquid electrolyte may include an organic solvent. The organic solvent may be any suitable organic solvent available in the art. For example, the organic solvent may be propylene carbonate, ethylene carbonate, fluoroethylene carbonate, butylene carbonate, dimethyl carbonate, diethyl carbonate, methyl ethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, 1,3-dioxorane, 4-methyldioxorane, N,N-dimethyl formamide, N,N-dimethyl acetamide, dimethylsulfoxide, dioxane, 1,2-dimethoxyethane, sulforane, dichloroethane, chlorobenzene, nitrobenzene, diethylene glycol, dimethyl ether, or a combination thereof. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO2)(C_yF_{2y+1}SO_2)$ (wherein x and y are natural numbers), LiCl, LiI, or a combination thereof.

Meanwhile, for example, to improve charge-discharge characteristics and flame resistance, an additive may included the nonaqueous electrolyte, including pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N, N-substituted imidazolidine, ethylene glycol dialkyl ether, an ammonium salt, pyrrole, 2-methoxyethanol, aluminum trichloride or a combination thereof. In some embodiments, to provide nonflammable characteristics, a halogen-containing solvent such as carbon tetrachloride, ethylene trifluoride, or the like may be further added to the nonaqueous electrolyte, if desired.

The lithium metal battery according to an embodiment may have excellent capacity and excellent lifetime characteristics, and thus may be used in a battery cell for use as a power source of a small device, and may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

According to still another embodiment, a method of manufacturing a lithium metal battery, includes: injecting a negative electrolyte composition between a lithium metal electrode and a positive electrode to provide an injected negative electrolyte composition, wherein the lithium metal electrode comprises a lithium metal or a lithium metal alloy, and the negative electrolyte composition includes a non-aqueous solvent including an ether-based solvent, a lithium salt having a concentration of about 1 M to about 6 M in the non-aqueous solvent, and a polymerizable oligomer; and heat-treating the injected negative electrolyte composition to form a gelled or solidified negative electrolyte including a crosslinked product of the polymerizable oligomer.

Figure 5A:
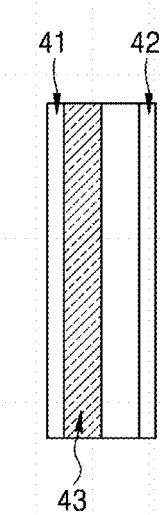
FIGS. 5A to 5C are schematic views illustrating a process of manufacturing a lithium metal battery, according to an embodiment of the present disclosure.
Figure 5B:
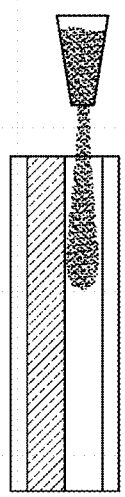
Figure 5C:
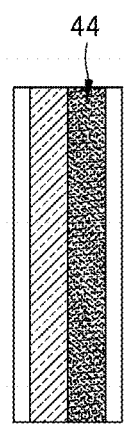

FIGS. 5A to 5C are schematic views illustrating a process of manufacturing a lithium metal battery according to an embodiment. Referring to FIG. 5, in the method of manufacturing a lithium metal battery, a negative electrolyte composition obtained by mixing a thermally crosslinkable polymerizable oligomer with an ether-based electrolyte including a high-concentration lithium salt, is injected in a liquid state into an electrochemical element including a positive electrode 41, a negative electrode 42, and a solid electrolyte 43 (or the like). The injected negative electrolyte composition is subjected to an in-situ thermal crosslinking process, and is then formed into a gelled or solidified negative electrolyte 44, e.g., a negative electrolyte having a gel or solid form.

The positive electrode may selectively include a sold electrolyte thereon.

The positive electrode may include a cathode active material and a positive electrolyte impregnated in the cathode active material.

The heat-treatment may be performed at a temperature of about 60° C. to 80° C. The thermal crosslinking of the polymerizable oligomer is induced within the above temperature range to form a crosslinked product of the polymerizable oligomer.

As used herein, the term "alkyl" refers to a saturated branched or unbranched (or straight-chained or linear) hydrocarbon group. Non-limiting examples of the "alkyl" group include methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxyl group, a C6-C20 heteroaryloxyalkyl group, or a C6-C20 heteroarylalkyl group.

The term "halogen atom" includes fluorine, bromine, chlorine, and iodine.

As used herein, the term "alkenyl" group refers to a branched or unbranched, monovalent hydrocarbon group having at least one carbon-carbon double bond. Non-limiting examples of the alkenyl group are vinyl, allyl, butenyl, isopropenyl, and isobutenyl. At least one hydrogen atom in the alkenyl group may be substituted with any of the substituents for the alkyl group as described above.

As used herein, the term "alkynyl" refers to a branched or unbranched hydrocarbon group having at least one carbon-carbon triple bond. Non-limiting examples of the "alkynyl" group are ethynyl, butynyl, isobutynyl, and propynyl.

At least one hydrogen atom of the "alkynyl" group may be substituted with any of the substituents for the alkyl group as described above.

The term "aryl" means a monovalent group formed by the removal of one hydrogen atom from one or more rings of an arene. Non-limiting examples of the "aryl" group are phenyl, naphthyl, and tetrahydronaphthyl.

At least one hydrogen atom of the "aryl" group may be substituted with any of the substituents for the alkyl group as described above.

As used herein, the term "heteroaryl" group refers to a monocyclic or bicyclic aromatic organic group that in which at least one ring member is a heteroatom selected from nitrogen (N), oxygen (O), phosphorous (P), and sulfur (S), and the rest of the cyclic atoms are all carbon. The heteroaryl group may include, for example, one to five heteroatoms, and may include a five- to ten-membered ring. In the heteroaryl group, S or N may be present in various oxidized forms.

Non-limiting examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyridine-2-yl, pyridine-3-yl, 2-pyrazine-2-yl, pyrazine-4-yl, pyrazine-5-yl, 2-pyrimidine-2-yl, 4-pyrimidine-2-yl, and 5-pyrimidin-2-yl.

The term "heteroaryl" includes a heteroaromatic ring that is selectively fused to at least one of an aryl group, a cycloaliphatic group, and a heterocyclic group.

As used herein, the term "carbocyclic" group refers to a saturated or partially unsaturated non-aromatic monocyclic, bicyclic, or tricyclic hydrocarbon group.

Non-limiting examples of the monocyclic hydrocarbon group include cyclopentyl, cyclopentenyl, cyclohexyl, and cyclohexenyl. Non-limiting examples of the bicyclic hydrocarbon group include bornyl, decahydronaphthyl, bicyclo[2.1.1]hexyl, bicyclo[2.2.1]heptyl, bicyclo[2.2.1]heptenyl, or bicyclo[2.2.2]octyl. A non-limiting example of the tricyclic hydrocarbon group includes adamantyl.

As used herein, the term "heterocyclic" group refers to a C5-C20 cyclic group, for example, a C5-C10 cyclic group, including at least one hetero atom. Here, the heteroatom is S, N, O, and B.

As used herein, the terms "alkoxy," "aryloxy," and "heteroaryloxy," refer to alkyl, aryl, and heteroaryl groups, respectively, which are linked via an oxygen atom.

One or more embodiments of the present disclosure will now be described in detail with reference to the following examples. However, these examples are only for illustrative purposes and are not intended to limit the scope of the one or more embodiments of the present disclosure.

EXAMPLES (Manufacture of Coin Type Li—Li Symmetric Cell)

Example 1

4.0 M LiN(SO$_2$F)$_2$ (hereinafter, LiFSI) was dissolved in a 1,2-dimethoxyethane (DME) solvent, and tetra(ethyleneglycol) diacrylate (TEGDA, Sigma-Aldrich, 302.32 grams per mole (g/mol)) was mixed in an amount of 30 parts by weight based on 100 parts by weight of the DME solvent, to prepare an electrolyte solution as a liquid electrolyte.

A lithium metal negative electrode (thickness: about 20 μm) and a counter electrode were made of the same lithium metal, and a polyethylene separator (porosity: about 48%) was disposed between the two electrodes to manufacture a lithium metal battery (coin type Li—Li symmetric cell). Then, the liquid electrolyte was injected between the two electrodes.

The manufactured Li—Li symmetric cell was heat-treated at 80° C. for 10 minutes to thermally crosslink TEGDA.

Example 2

A lithium metal battery was manufactured in the same manner as in Example 1, except that poly(styrene-b-divinylbenzene) block copolymer microspheres (average particle diameter: about 3 μm) (EPR-PSD-3, EPRUI Ltd.) were further added to the liquid electrolyte in an amount of 10 wt % based on DME, and thermal crosslinking was carried out.

Comparative Example 1

A lithium metal negative electrode (thickness: about 20 μm) and a counter electrode were made of the same lithium metal, and a polyethylene separator (porosity: about 48%) was disposed between the two electrodes to manufacture a lithium metal battery (coin type Li—Li symmetric cell). Here, a liquid electrolyte was injected between the two electrodes.

As the liquid electrolyte, an electrolyte solution, in which 4.0 M LiFSI was dissolved in DME, was used.

Comparative Example 2

A lithium metal negative electrode (thickness: about 20 μm) and a counter electrode were made of the same lithium metal, and a polyethylene separator (porosity: about 48%) was disposed between the two electrodes to manufacture a lithium metal battery (coin type Li—Li symmetric cell). Here, a liquid electrolyte was injected between the two electrodes.

As the liquid electrolyte, an electrolyte solution, in which 4.0 M LiFSI was dissolved in a DME solvent and TEGDA was mixed in an amount of 30 parts by weight based on 100 parts by weight of the DME solvent, was used.

Comparative Example 2 is the same as Example 1, except that thermal crosslinking was not carried out.

(Manufacture of Pouch Type Cell)

Example 3

4.0 M LiFSI was dissolved in a DME solvent, and TEGDA was mixed in an amount of 30 parts by weight based on 100 parts by weight of the DME solvent to prepare an electrolyte solution as a liquid electrolyte.

LiNi$_{1/3}$Co$_{1/3}$Mn$_{1/3}$O$_2$, a conductive agent (Super-P; Timcal Ltd.), polyvinylidene fluoride (PVdF), and N-methylpyrrolidone were mixed to obtain a positive electrode composition. The mixing weigh ratio of LiNi$_{1/3}$Co$_{1/3}$Mn$_{1/3}$O$_2$, conducting agent and PVdF in the positive electrode composition was about 97:1.5:1.5. About 137 g of N-methylpyrrolidone was used with respect to 97 g of LiNi$_{1/3}$Co$_{1/3}$Mn$_{1/3}$O$_2$.

An aluminum foil (thickness: about 15 μm) was coated thereon with the positive electrode composition, dried at 25° C., and then further dried at about 110° C. to prepare a positive electrode.

Then, a polyethylene separator (porosity: about 48%) was disposed between the resulting positive electrode and a lithium metal negative electrode (thickness: about 20 μm) to manufacture a lithium metal battery (area: 3×3 cm$^2$, pouch type full cell). Here, the liquid electrolyte was injected between the positive electrode and the lithium metal negative electrode.

The manufactured lithium metal battery was heat-treated at 80° C. for 10 minutes to thermally crosslink TEGDA.

Example 4

A lithium metal battery (area: 3×3 cm$^2$, pouch type cell) was manufactured in the same manner as in Example 3, except that a lithium metal negative electrode (thickness: about 20 μm) and a counter electrode were made of the same lithium metal.

Example 5

A lithium metal battery was manufactured in the same manner as in Example 3, except that poly(styrene-b-divinylbenzene) block copolymer microspheres (average particle diameter=about 3 μm) (EPR-PSD-3, from EPRUI Ltd.) were further added to the liquid electrolyte in an amount of 10 wt % based on DME, and thermal crosslinking was carried out.

Comparative Example 3

A lithium metal battery was manufactured in the same manner as in Example 2, except that an electrolyte solution, in which 4.0M LiN(SO$_2$F)$_2$ (hereinafter, LiFSI) was dissolved in 1,2-dimethoxyethane (DME), was used without the addition of TEGDA.

Evaluation Example 1: Impedance Measurement

Resistance of the lithium metal batteries of Examples 1 and 2 and Comparative Examples 1 and 2 at 60° C. were measured using an impedance analyzer (Solartron 1260A Impedance/Gain-Phase Analyzer) according to a 2-probe method. The amplitude was ±10 mV, and the frequency range was 0.1 hertz (Hz) to 1 megahertz (MHz).

Figure 6:
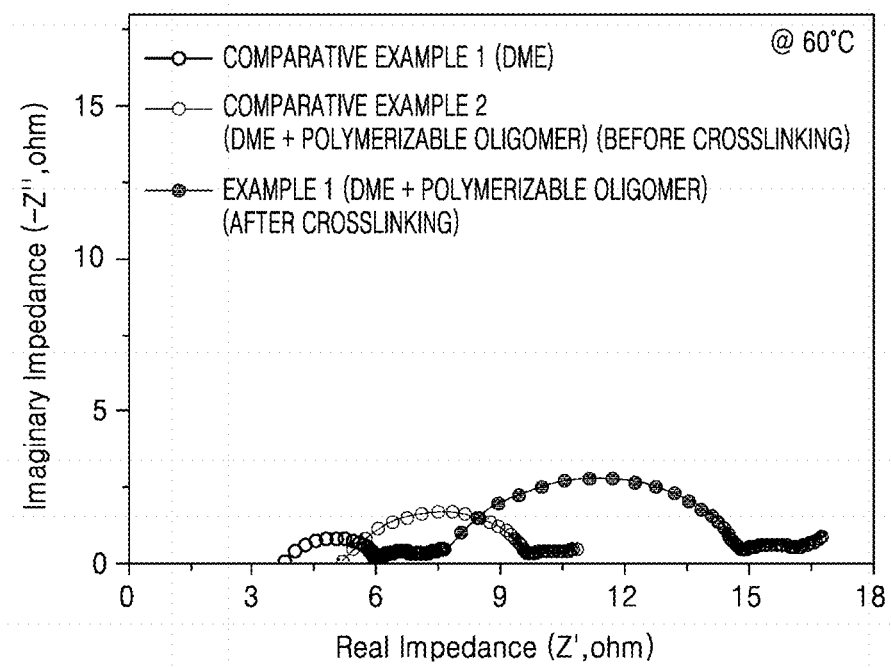
FIG. 6 is a Nyquist plot of imaginary impedance (Z″, ohms) versus real impedance (Z′, ohms), which illustrates the impedance measurement results of the lithium metal batteries manufactured according to Example 1 and Comparative Examples 1 and 2.

FIG. 6 shows a Nyquist plot of impedance measurement results obtained when 24 hours elapsed after the manufacture of the lithium metal batteries of Example 1 and Comparative Examples 1 and 2. In FIG. 6, the interfacial resistance between the electrode and the electrolyte is determined by the position and size of a semicircle. The interfacial resistance of the lithium metal batteries of Examples 1 and 2 and Comparative Examples 1 and 2 are given in Table 1 below.

TABLE 1

| Example | Interfacial resistance (ohms, Ω) |
|---|---|
| Comparative Example 1 | 2.25 |
| Comparative Example 2 | 4.5 |
| Example 1 | 7.4 |
| Example 2 | 7.6 |

Further, the bulk resistances of the lithium metal batteries of Examples 1 and 2 and Comparative Examples 1 and 2 were examined, and the results thereof are given in Table 2 below.

TABLE 2

| Example | Bulk impedance (ohms, Ω) |
|---|---|
| Comparative Example 1 | 3.8 |
| Comparative Example 2 | 5.2 |
| Example 1 | 7.5 |
| Example 2 | 8.2 |

As shown in FIG. 6 and Tables 1 and 2, in the impedance measurement, the initial resistance value (bulk impedance and interfacial resistance) of Comparative Example 2 was increased as compared with Comparative Example 1. Without being limited by theory, it is believed that the resistance increases due to the viscosity increase of the electrolyte when the crosslinkable polymerizable oligomer is added.

Further, the initial resistance value of Example 1 was increased as compared with Comparative Example 2. Without being limited by theory, it is understood that the resistance of the electrolyte is increased after the crosslinking of the crosslinkable polymerizable oligomer, and the solidification of the liquid electrolyte can be indirectly confirmed.

Evaluation Example 2: Evaluation of Cycle Characteristics (Cell Voltage)

The charging and discharging of the lithium metal batteries were carried out under conditions of a current density of 1.5 milliampere per square centimeter (mA/cm$^2$), charging/discharging time of 2 h/2 h and charging/discharging capacity of 3.0 mAh/cm$^2$ at 60° C., and the changes in cell voltage over time were examined.

Figure 7:
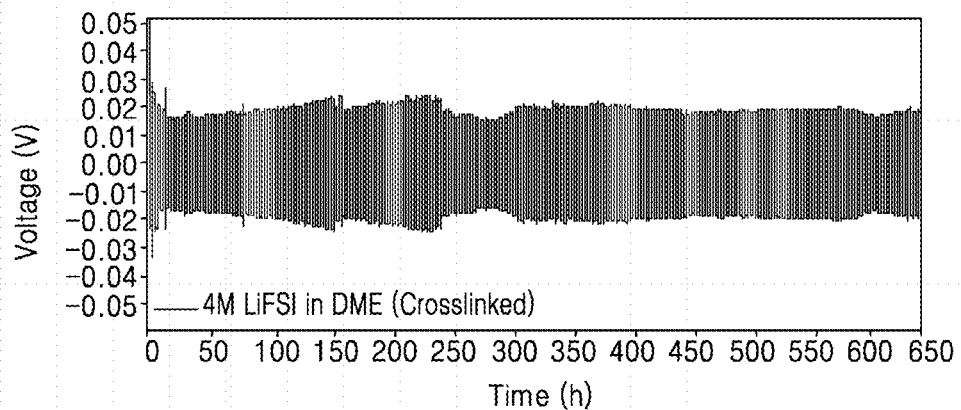
FIG. 7 is a graph of voltage (volts, V) versus time (hours, h), which illustrates the cell voltage change over time of a lithium metal battery manufactured according to Example 1.
Figure 8:
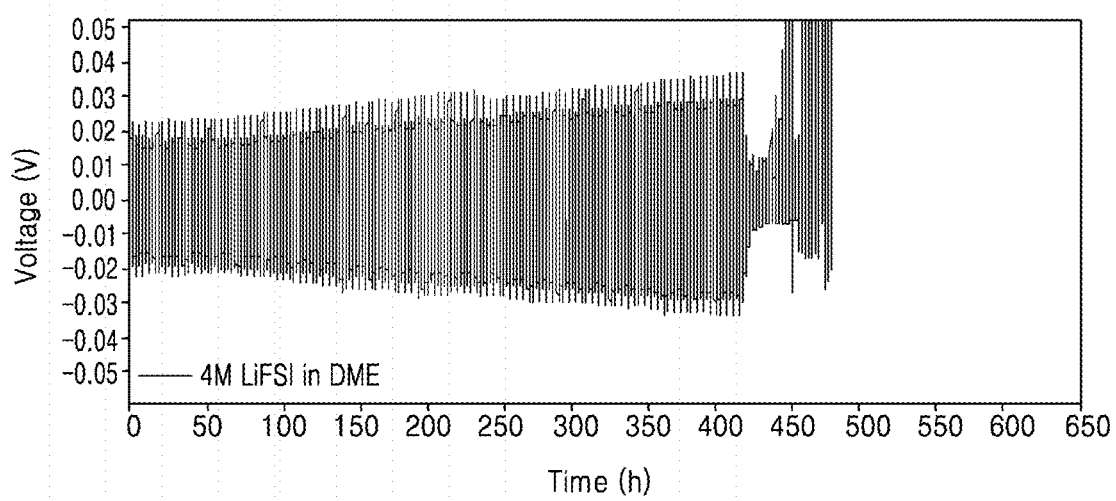
FIG. 8 is a graph of voltage (V) versus time (h), which illustrates the cell voltage change over time of a lithium metal battery manufactured according to Comparative Example 2.

FIGS. 7 and 8 show the changes in cell voltage of the lithium metal batteries of Example 1 and Comparative Example 1, respectively.

As shown in FIGS. 7 and 8, it was found that the lithium metal battery of Comparative Example 1, caused a short phenomenon for about 100 cycles, and exhibited a lifetime of about 105 cycles. In contrast, it was found that the lithium metal battery of Example 1 was stably driven even after 110 cycles or more.

Figure 9A:
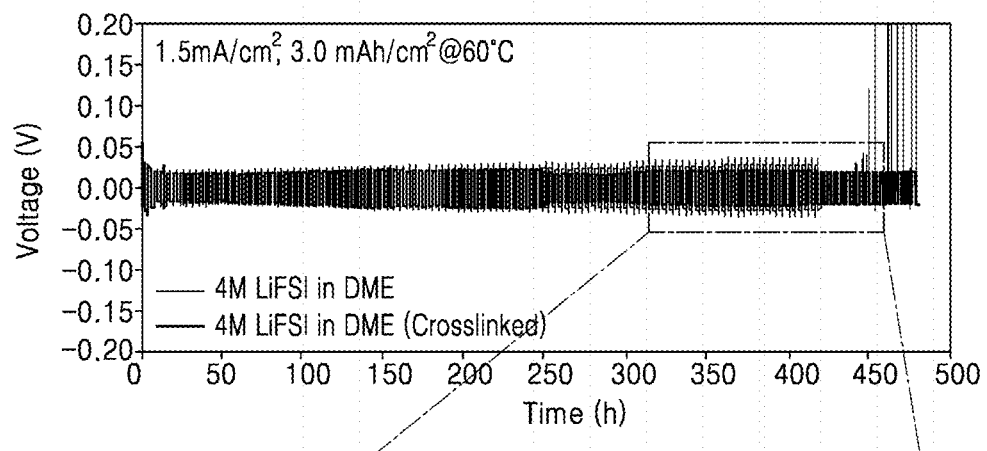
FIG. 9A is a graph of voltage (V) versus time (h) in which changes in cell voltage of lithium metal batteries manufactured according to Example 1 and Comparative Example 2 are overlapped and compared with each other.
Figure 9B:
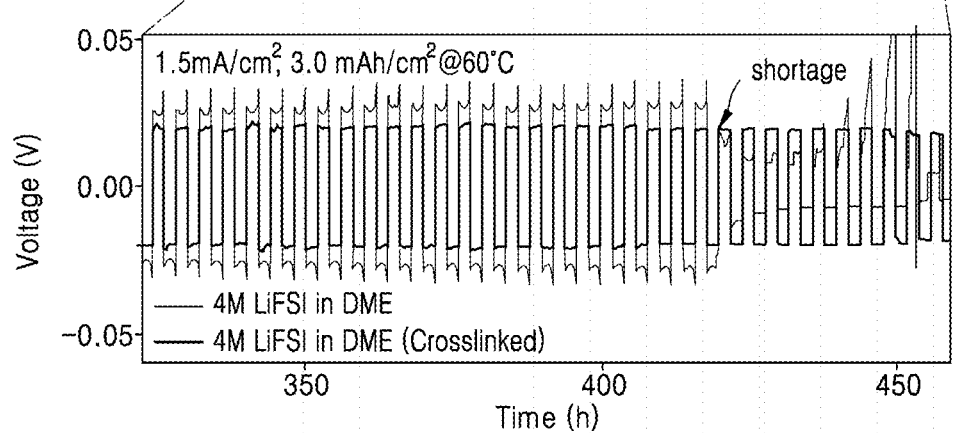
FIG. 9B is an enlarged portion of the graph in FIG. 9A, which shows the change in cell voltage over time between about 320 h and 460 h.

FIG. 9 is a graph in which changes in cell voltage of the lithium metal batteries of Example 1 and Comparative Example 2 are overlapped and compared with each other, and the change in cell voltage over time, between about 320 h and 460 h, is enlarged.

As shown in FIG. 9, it can be seen that the graph shape observed during deposition-stripping is changed depending on the changes in cell voltage of the lithium metal batteries of Example 1 and Comparative Example 2. Thus, the lithium metal battery of Example 1 can be driven for 110 cycles or more.

Evaluation Example 3: Cell Thickness Change

Figure 10:
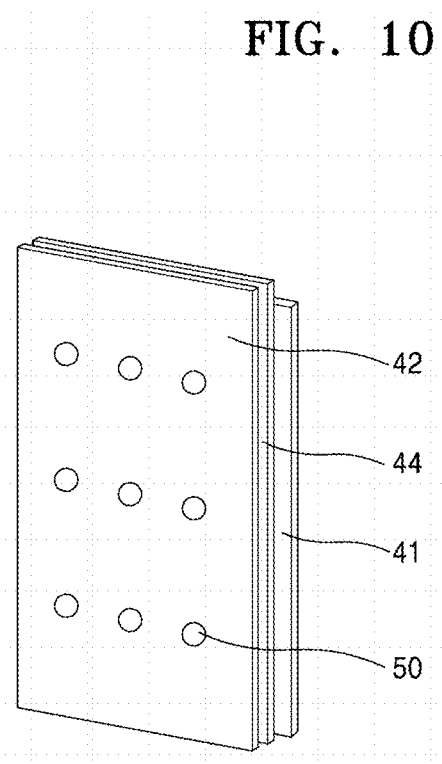
FIG. 10 illustrates the position of each of the nine points on a pouch cell exterior used for measuring the average thickness variation of a pouch exterior in accordance with Evaluation Example 3.

The constant current charging of lithium metal batteries (pouch cells) of Examples 3 to 5 and Comparative Example 3 was carried out with a current of 0.1 C rate (0.3 mA/cm$^2$) at 25° C. until a voltage reaches 4.2 V (vs. Li), and was then cut off at a current of 0.05 C rate while maintaining 4.2 V in a constant voltage mode. After charging was carried out one time, the average thickness change of a pouch exterior including the anode 42, the separator 44, and the cathode 41, with respect to nine points 50 shown in FIG. 10 was measured using a micrometer, and the results thereof are given in Table 3 below.

TABLE 3

|  | Comparative Example 3 | Example 3 | Example 4 | Example 5 |
|---|---|---|---|---|
| Cell type | Li/NCM | Li/NCM | Li/Li | Li/NCM |
| Electrolyte | 4M LiFSI in DME | 4M LiFSI in DME (crosslinked) | 4M LiFSI in DME (crosslinked) | 4M LiFSI in DME (MS + crosslinked) |

TABLE 3-continued

| | Comparative Example 3 | Example 3 | Example 4 | Example 5 |
|---|---|---|---|---|
| Temperature | 60° C. | 60° C. | 60° C. | 60° C. |
| Average thickness change | 63 μm | 18 μm | 18 μm | 16 μm |

As given in Table 3, it can be seen that the changes in cell thickness of the lithium metal batteries of Examples 3 to 5 after charging are greatly decreased.

As described above, according to the one or more embodiments, a negative electrolyte for a lithium metal battery has an ionic conductivity to that of a liquid, has high strength, and can improve the lifetime characteristics and stability of a lithium metal battery.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A negative electrolyte for a lithium metal battery, the negative electrolyte comprising:
 a non-aqueous solvent comprising an ether solvent;
 a lithium salt having a concentration of about 1 molar to about 6 molar in the non-aqueous solvent; and
 a crosslinked product of a polymerizable oligomer,
 wherein the electrolyte has a gel or a solid form.

2. The negative electrolyte of claim 1, wherein the polymerizable oligomer has a weight average molecular weight of about 5,000 Daltons or less.

3. The negative electrolyte of claim 1, wherein the polymerizable oligomer comprises an ion conductive unit containing an ether group.

4. The negative electrolyte of claim 1, wherein the polymerizable oligomer comprises a thermally crosslinkable (meth)acrylate functional group.

5. The negative electrolyte of claim 1, wherein the polymerizable oligomer comprises diethylene glycol diacrylate, triethylene glycol diacrylate, tetraethylene glycol diacrylate, polyethylene glycol diacrylate, dipropylene glycol diacrylate, tripropylene glycol diacrylate, ethoxylated trimethylolpropane triacrylate, acrylate-functionalized ethylene oxide, 1,6-hexanediol diacrylate, ethoxylated neopentyl glycol diacrylate; propoxylated neopentyl glycol diacrylate, allyl methacrylate, trimethylolpropane triacrylate, trimethylolpropane trimethacrylate, pentaerythritol triacrylate, ethoxylated propoxylated trimethylolpropane triacrylate, glyceryl/propoxylated triacrylate, tris(2-hydroxyethyl) isocyanurate triacrylate, pentaerythritol tetraacrylate, and dipentaerythritol pentaacrylate, or a combination thereof.

6. The negative electrolyte of claim 1, wherein an amount of the crosslinked product of the polymerizable oligomer is about 10 parts by weight to about 60 parts by weight, based on 100 parts by weight of the non-aqueous solvent.

7. The negative electrolyte of claim 1, wherein the non-aqueous solvent consists of an ether solvent.

8. The negative electrolyte of claim 1, wherein the ether solvent comprises dimethyl ether, diethyl ether, methyl ethyl ether, dibutyl ether, 1,2-dimethoxyethane, 1,2-diethoxyethane, ethoxymethoxyethane, 2-methyltetrahydrofuran, tetrahydrofuran, ethyleneglycol dimethyl ether (1,2-dimethoxyethane), ethylene glycol diethyl ether (1,2-diethoxyethane), propylene glycol dimethyl ether, propylene glycol diethyl ether, butylene glycol dimethyl ether, butylene glycol diethyl ether, diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, dipropylene glycol dimethyl ether, tripropylene glycol dimethyl ether, tetrapropylene glycol dimethyl ether, dipropylene glycol diethyl ether, tripropylene glycol diethyl ether, tetrabutylene glycol dimethyl ether, tetrabutylene glycol dimethyl ether, dibutylene glycol diethyl ether, tributylene glycol diethyl ether, tetrabutylene glycol diethyl ether, poly(ethylene glycol) dilaurate, poly(ethylene glycol) monoacrylate, poly(ethylene glycol) diacrylate, or a combination thereof.

9. The negative electrolyte of claim 1, wherein the lithium salt comprises LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof.

10. The negative electrolyte of claim 1, wherein the lithium salt has a concentration of about 4 molar to about 5 molar.

11. The negative electrolyte of claim 1, further comprising:
 a particle comprising an organic particle, an inorganic particle, an organic-inorganic particle, or a combination thereof, wherein the particle has a particle size of greater than 1 micrometer to about 100 micrometers.

12. The negative electrolyte of claim 11, wherein the particle is a microsphere having an average particle diameter of about 1.1 micrometer to about 50 micrometers.

13. The negative electrolyte of claim 11, wherein the particle has a chemically or physically crosslinked structure.

14. The negative electrolyte of claim 11, wherein the particle comprises a polymer comprising polystyrene, a copolymer comprising a styrene repeating unit, a copolymer comprising a repeating unit containing a crosslinkable functional group, a crosslinked polymer, or a combination thereof.

15. The negative electrolyte of claim 14, wherein the polymer comprises a polystyrene homopolymer, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(acrylonitrile-styrene-(C1-C9 alkyl)acrylate) copolymer; a crosslinked polymer thereof, or a combination thereof.

16. The negative electrolyte of claim 11, wherein the particle comprises
   a first particle comprising a cage-structured silsesquioxane, a metal-organic frame, $Li_{1+x+y}Al_xTi_{2-x}Si_yP_{3-y}O_{12}$ wherein $0<x<2$ and $0\leq y<3$, $BaTiO_3$, $Pb(Zr_aTi_{1-a})O_3$ wherein $0\leq a\leq 1$, $Pb_{1-x}La_xZr_{1-y}Ti_yO_3$ wherein $0\leq x\leq 1$ and $0\leq y<1$, $Pb(Mg_3Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$, wherein $0<x<2$ and $0<y<3$, $Li_xAl_yTi_z(PO_4)_3$ wherein $0<x<2$, $0<y<1$, and $0<z<3$, $Li_{1+x+y}(Al_aGa_{1-a})_x(Ti_bGe_{1-b})_{2-x}Si_yP_{3-y}O_{12}$ wherein $0\leq x\leq 1$, $0\leq y\leq 1$, $0\leq a\leq 1$ and $0\leq b\leq 1$, $Li_xLa_yTiO_3$ wherein $0<x<2$ and $0<y<3$, $Li_xGe_yP_zS_w$ wherein $0<x<4$, $0<y<1$, $0<z<1$, and $0<w<5$, $Li_xN_y$ wherein $0<x<4$, $0<y<2$, a glass of the formula $Li_xSi_yS_z$ wherein $0<x<3$, $0<y<2$, and $0<z<4$, a glass of the formula $Li_xP_yS_z$ wherein $0<x<3$, $0<y<3$, and $0<z<7$, $Li_2O$, $LiF$, $LiOH$, $Li_2CO_3$, $LiAlO_2$, a ceramic of the formula $Li_2O$—$Al_2O_3$—$SiO_2$—$P_2O_5$—$TiO_2$—$GeO_2$, and a garnet of the formula $Li_{3+x}La_3M_2O_{12}$, wherein $0\leq x\leq 5$ and M is Te, Nb, or Zr, or a combination thereof; or
   a crosslinked structure of the first particle including a crosslinkable functional group; or
   a combination thereof.

17. The negative electrolyte of claim 11, wherein the organic particle comprises a block copolymer comprising a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly(methacrylate-butadiene-styrene) copolymer, a poly(styrene-acrylate) copolymer, a poly(acrylonitrile-styrene-acrylate) copolymer, or a combination thereof.

18. A lithium metal battery comprising:
   a lithium metal electrode comprising a lithium metal or a lithium metal alloy;
   the negative electrolyte of claim 1 on at least a portion of the lithium metal electrode; and
   a positive electrode facing the lithium metal electrode.

19. The lithium metal battery of claim 18, further comprising a positive electrolyte between the negative electrolyte and the positive electrode.

20. The lithium metal battery of claim 19, wherein the positive electrolyte comprises a liquid electrolyte, a solid electrolyte, a gel electrolyte, a polymer ionic liquid, or a combination thereof.

21. The lithium metal battery of claim 18, further comprising a protective layer on at least a portion of the lithium metal electrode.

22. The lithium metal battery of claim 18, wherein the lithium metal battery comprises a separator.

23. A method of manufacturing a lithium metal battery, comprising:
   injecting a negative electrolyte composition between a lithium metal electrode and a positive electrode to provide an injected negative electrolyte composition, wherein the lithium metal electrode comprises a lithium metal or a lithium metal alloy, and the negative electrolyte composition comprises a non-aqueous solvent comprising an ether solvent, a lithium salt having a concentration of about 1 molar to about 6 molar in the non-aqueous solvent, and a polymerizable oligomer; and
   heat-treating the injected negative electrolyte composition to form a gelled or solidified negative electrolyte comprising a crosslinked product of the polymerizable oligomer.

24. The method of claim 23, wherein the heat-treating is performed at a temperature of about 60° C. to about 80° C.

25. The method of claim 23, wherein the positive electrode comprises a solid electrolyte thereon.

* * * * *